(12) United States Patent
Zimmer et al.

(10) Patent No.: US 9,879,459 B2
(45) Date of Patent: Jan. 30, 2018

(54) ACCELERATION AND DECELERATION ARRANGEMENT WITH OVERLOAD PROTECTION

(71) Applicants: Guenther Zimmer, Rheinau (DE); Martin Zimmer, Rheinau (DE)

(72) Inventors: Guenther Zimmer, Rheinau (DE); Martin Zimmer, Rheinau (DE)

( * ) Notice: Subject to any disclaimer, the term of this patent is extended or adjusted under 35 U.S.C. 154(b) by 56 days.

(21) Appl. No.: 15/072,032

(22) Filed: Mar. 16, 2016

(65) Prior Publication Data

US 2016/0340955 A1  Nov. 24, 2016

(30) Foreign Application Priority Data

Mar. 17, 2015  (DE) ........................ 10 2015 003 414

(51) Int. Cl.

| | |
|---|---|
| *E05F 3/00* | (2006.01) |
| *E05F 3/10* | (2006.01) |
| *E05F 5/00* | (2017.01) |
| *E05F 1/16* | (2006.01) |
| *F16C 29/00* | (2006.01) |
| *F16C 41/00* | (2006.01) |
| *A47B 88/483* | (2017.01) |

(52) U.S. Cl.
CPC .............. *E05F 3/10* (2013.01); *A47B 88/483* (2017.01); *E05F 1/16* (2013.01); *E05F 5/003* (2013.01);
(Continued)

(58) Field of Classification Search
CPC ..... E05F 5/003; E05F 3/00; E05F 3/02; E05F 3/04; E05F 3/18; E05F 3/227; E05F 3/22; E05F 3/10; E05F 3/108; E05F 5/05; E05F 1/08; E05F 1/1091; E05F 1/16; E05F 3/244; E05F 5/02; E05Y 2800/24; E05Y 2800/21; E05Y 2201/64; E05Y 2201/644;
E05Y 2201/264; E05Y 2201/41; E05Y 2201/412; E05Y 2201/47; E05Y 2201/21; E05Y 2201/488; E05Y 2900/132;
(Continued)

(56) References Cited

U.S. PATENT DOCUMENTS

| | | | |
|---|---|---|---|
| 2009/0273129 A1* | 11/2009 | Zimmer .................... | E05F 1/16 267/170 |
| 2011/0023370 A1* | 2/2011 | Zimmer .................... | E05F 1/16 49/360 |

(Continued)

FOREIGN PATENT DOCUMENTS

| | | |
|---|---|---|
| DE | 20 2004 018 189 U1 | 4/2005 |
| DE | 10 2007 008 688 A1 | 8/2008 |

(Continued)

*Primary Examiner* — Chuck Mah
(74) *Attorney, Agent, or Firm* — Klaus J. Bach

(57) ABSTRACT

In a combined acceleration and deceleration device with a carrier housing and a carrier element which is movable along at least one guide track of the carrier housing between a force and/or form-locking park position and an end position under the control of an acceleration arrangement and a deceleration arrangement including a hydraulic cylinder-piston unit with a spring return structure. The cylinder-piston unit carries a guide member which is guided by the guide track and has a curved stop surface and the carrier element has a curved push surface with the push surface area and the stop surface area having different radii of curvature so that they contact each other maximally along a contact line.

7 Claims, 3 Drawing Sheets

(52) U.S. Cl.
CPC .......... *F16C 29/002* (2013.01); *F16C 41/001* (2013.01); *E05Y 2800/24* (2013.01); *F16C 2314/72* (2013.01)

(58) Field of Classification Search
CPC .......... E05Y 2900/142; E05Y 2900/14; E05Y 2201/232; E05Y 2201/426; E05Y 2201/638; E05Y 2201/688; E05Y 2800/11; E05D 15/00; E05D 15/06; E05D 15/12; A47B 88/047; A47B 88/12; A47B 88/14; A47B 2210/0091
See application file for complete search history.

(56) References Cited

U.S. PATENT DOCUMENTS

| | | | | |
|---|---|---|---|---|
| 2011/0167588 A1* | 7/2011 | Chang | ............... | E05F 5/003 16/71 |
| 2011/0203075 A1* | 8/2011 | Iwaki | ............... | E05F 11/08 16/49 |
| 2011/0210653 A1* | 9/2011 | Salice | ............... | A47B 88/47 312/319.1 |
| 2013/0091665 A1* | 4/2013 | Tsai | ............... | E05F 3/18 16/49 |
| 2013/0133157 A1* | 5/2013 | Kimura | ............... | E05F 3/00 16/49 |
| 2014/0026357 A1* | 1/2014 | Zimmer | ............... | E05F 1/16 16/72 |
| 2014/0109343 A1* | 4/2014 | Chang | ............... | E05F 5/003 16/49 |

FOREIGN PATENT DOCUMENTS

| | | |
|---|---|---|
| DE | 20 2009 005 433 U1 | 7/2009 |
| DE | 10 2012 115 662 A1 | 3/2013 |
| EP | 2 526 825 A1 | 11/2012 |
| JP | 2008223456 A * | 9/2008 |

* cited by examiner

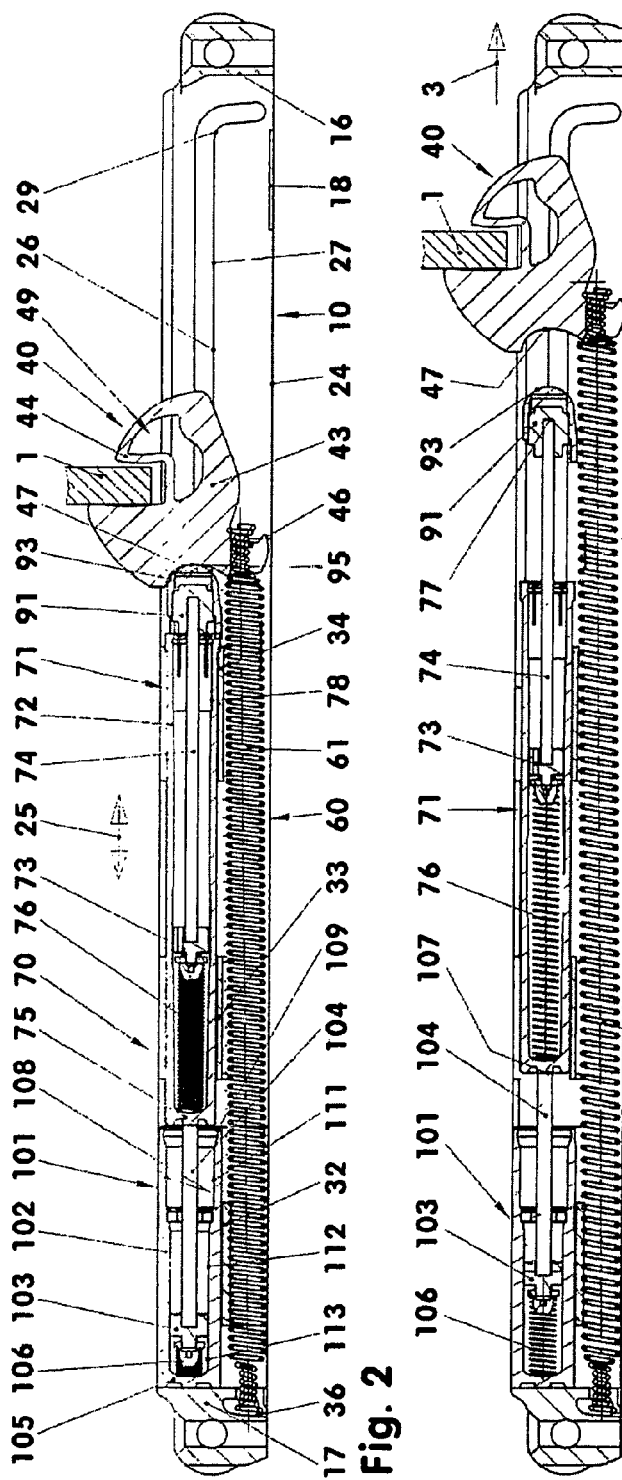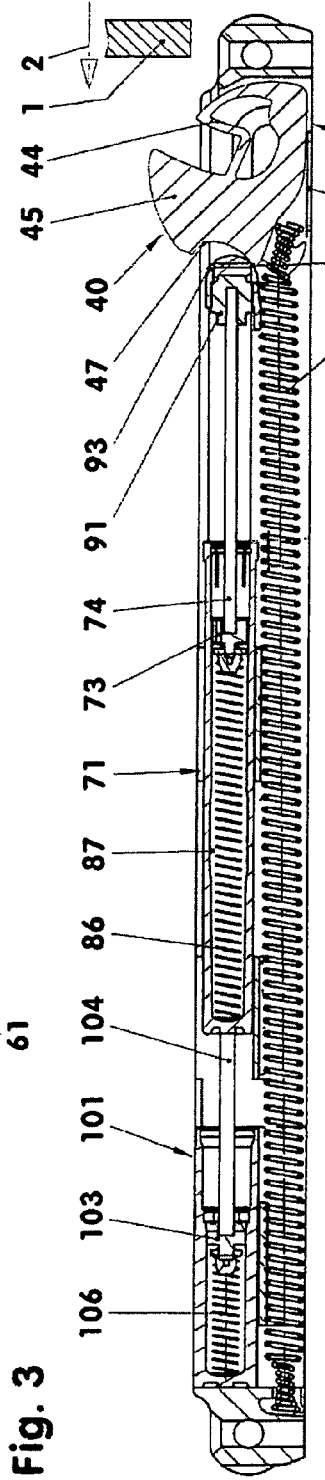

ACCELERATION AND DECELERATION ARRANGEMENT WITH OVERLOAD PROTECTION

BACKGROUND OF THE INVENTION

The invention resides in a combined acceleration and deceleration device with a carrier housing including a carrier element which is movable along a guide track of the carrier housing between a force- and/or form-locking park position and an end position by means of a carrier element which can be subjected to an acceleration structure and at the same time to a deceleration structure, which includes at least one hydraulic cylinder piston unit with a spring-operated carrier element return mechanism.

EP 1 562 458 A1 discloses such an arrangement wherein however, with a sudden load on the carrier element, the pivot joint between the carrier element and the carriage can be overloaded or the carriage may be tilted and cause an eccentric stress on the piston rod.

It is therefore the object of the present invention to provide a device which remains reliably functional even when subjected to multiple shock-like loads.

SUMMARY OF THE INVENTION

In a combined acceleration and deceleration device with a carrier housing and a carrier element which is movable along at least one guide track of the carrier housing between a force and/or form-locking park position and an end position under the control of an acceleration arrangement and a deceleration arrangement including a hydraulic cylinder-piston unit with a spring return structure. The cylinder-piston unit carries a guide member which is guided by the guide track and has a curved stop surface and the carrier element has a curved push surface with the push surface area and the stop surface area having different radii of curvature so that they contact each other maximally along a contact line.

The invention will become more readily apparent from and the following description of schematically shown embodiments with reference to the accompanying drawings:

BRIEF DESCRIPTION OF THE DRAWINGS

The drawings show in:
FIG. 2: A longitudinal cross-sectional view of FIG. 1;
FIG. 3: A longitudinal cross-sectional view of the device during charging of the energy store;
FIG. 4: A longitudinal cross-sectional view of the device before the release of the carrier element.

DESCRIPTION OF EXEMPLARY EMBODIMENTS

Figure 1:
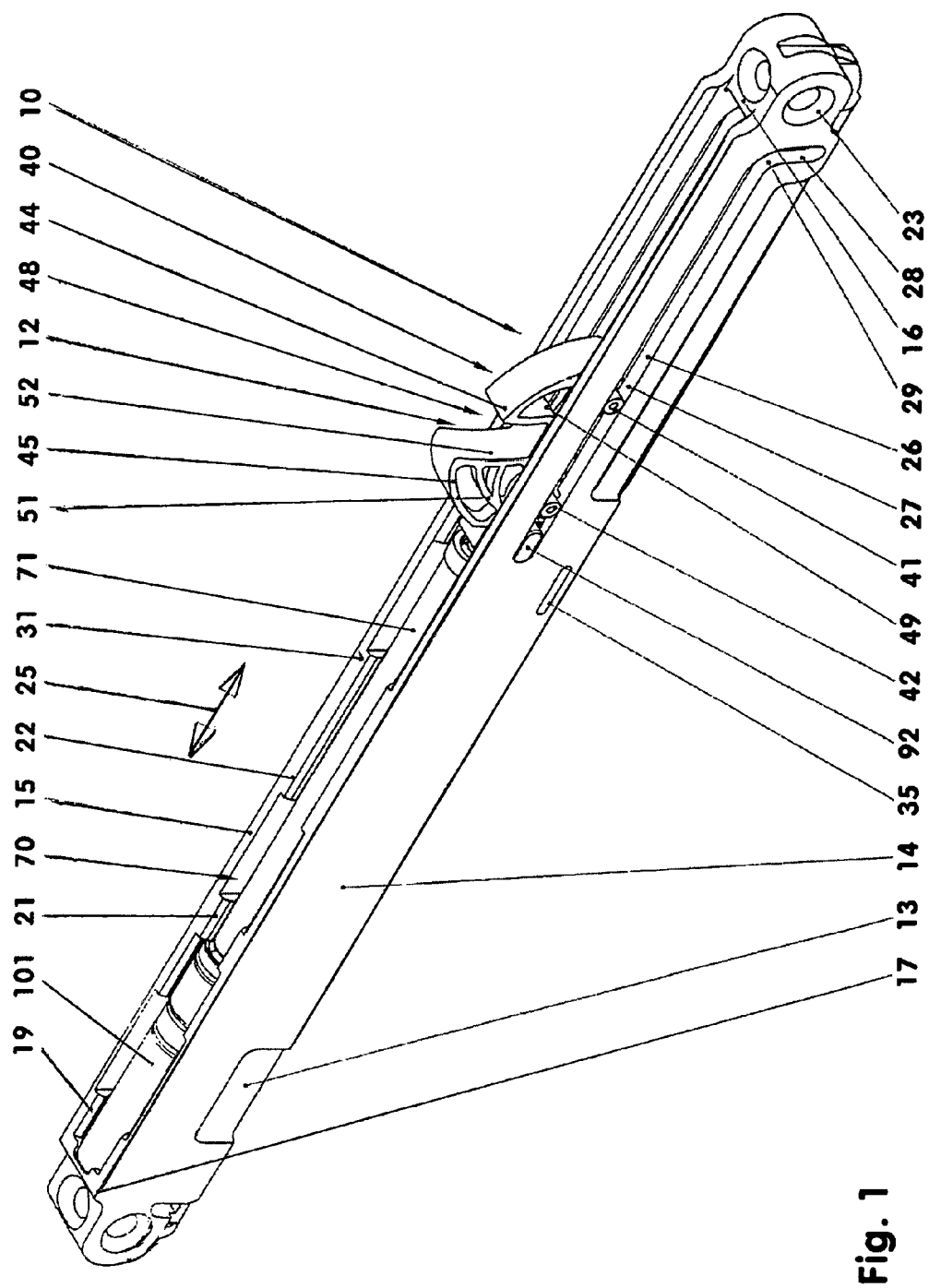
FIG. 1: An isometric view of a combined acceleration and deceleration device.
Figure 7:
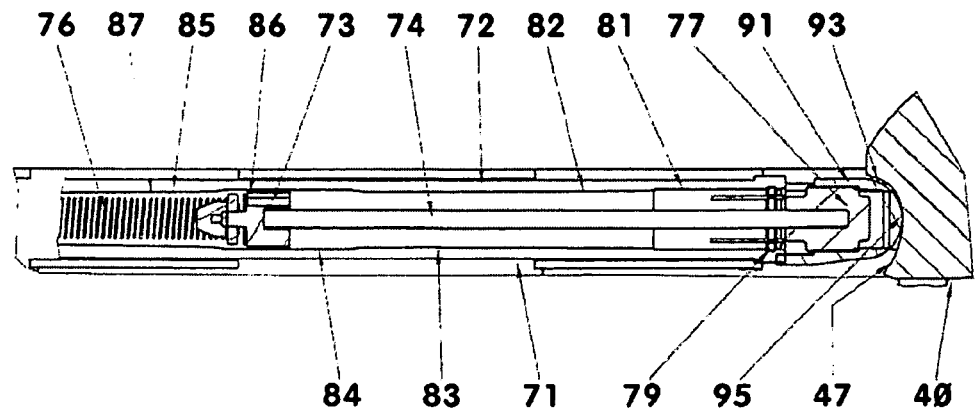
FIG. 7: A detail of FIG. 2.

FIGS. 1, 2 and 7 show a combined acceleration and deceleration device 10 in an isometric longitudinal view and in a longitudinal cross-sectional view. Such devices 10 are used to move for example furniture parts which are movable relative to a stationary furniture body, such as drawers, sliding doors, etc. into an end position in a controlled manner. The end position may be a fully open or a fully closed position of the furniture part.

The combined acceleration and deceleration device 10 may be arranged for example on the furniture body whereas the movable furniture part is provided with a carrier 1. During linear movement or displacement of the movable furniture part toward the end position, the carrier 1 contacts, before reaching the end position, a carrier element 40 of the acceleration and deceleration device 10. This carrier element 40 is then released from a force- and/or form-locking secure park position 11, see FIG. 4. After its release, the carrier element 40 is accelerated or pulled by the acceleration arrangement 60 toward the end position and, at the same time, slowed down by the deceleration arrangement 70 which counteracts the movement of the carrier element. The acceleration arrangement 60 comprises a repeatedly chargeable and dischargeable energy store 61. The drawer or sliding door etc. is now moved toward for example the closed end position 11 which it reaches without abutment shock.

The acceleration and deceleration device 10 comprises a carrier housing 13 which includes the carrier element 40, the acceleration arrangement 60 and the deceleration arrangement 70. The carrier housing 13 is for example a frame-like structure. It has two side walls 14, 15 which are arranged opposite each other and are joined by a front wall 16, a rear wall 17 and a connecting web 18 arranged at the bottom as well as several guide webs 32-34. The carrier housing 13 consists in the exemplary embodiment for example of a thermoplastic material, At its, in the longitudinal direction 25, opposite ends, the carrier housing 13 is provided with mounting openings 23.

At the opposite front-side ends, the side walls 14, 15 are provided with congruent guide tracks 26. These guide tracks 26, which may also be in the form of elongated hole-shaped cut-outs, comprise in each case a horizontal guide section 27 and a holding section 28. The guide section 27 and the holding section 28 are joined by a curved transition section 29.

The guide sections 27 extend parallel to the longitudinal direction 25 of the acceleration and deceleration device 10. Over their length, the guide sections have a constant height. The holding section 28 extends toward the bottom 24 at an angle of for example 85 degrees with respect to the guide section 27. The guide track width of the holding section 28 and of the curved transition section 28, which tangentially transitions into the adjacent guide section 27, corresponds to the height of the guide section 27. The length of the individual guide tracks 26 parallel to the longitudinal direction 25 is for example greater than one third of the length of the carrier housing 13.

At its top side 31, the carrier housing 13 is provided with guide ledges 19, 21, 22. The guide ledges 19, 21, 22 are oriented parallel to the longitudinal direction 25 and extend for example with a width of two millimeters toward the vertical center plane of the acceleration and deceleration device 10.

The guide ledges 19, 21, 22 are arranged in the exemplary embodiment opposite each other on the sidewalls 14, 15. Each side wall 14, 15 is provided for example with three guide ledges 19, 21, 22. The guide webs 32-34 which arranged in the center area of the carrier housing 13 are for example arranged displaced in the longitudinal direction 25 with respect to the guide ledges 19, 21, 22. In the exemplary embodiment, the center web 32 which is closest to the rear wall 17 is arranged lower by two millimeters than the two other center guide webs 33, 34.

The carrier housing 13 has for example formed in its side walls 14, 15 longitudinal slots 35 arranged in the lower area toward the center thereof, in which for example an additional mounting element can be engaged.

The carrier element 40 is provided at each side with two guide pins 41, 42 by which it is guided in the guide tracks 26 of the carrier housing 3. In each case, two oppositely arranged guide pins 41, 42 are in axial alignment.

Figure 5:
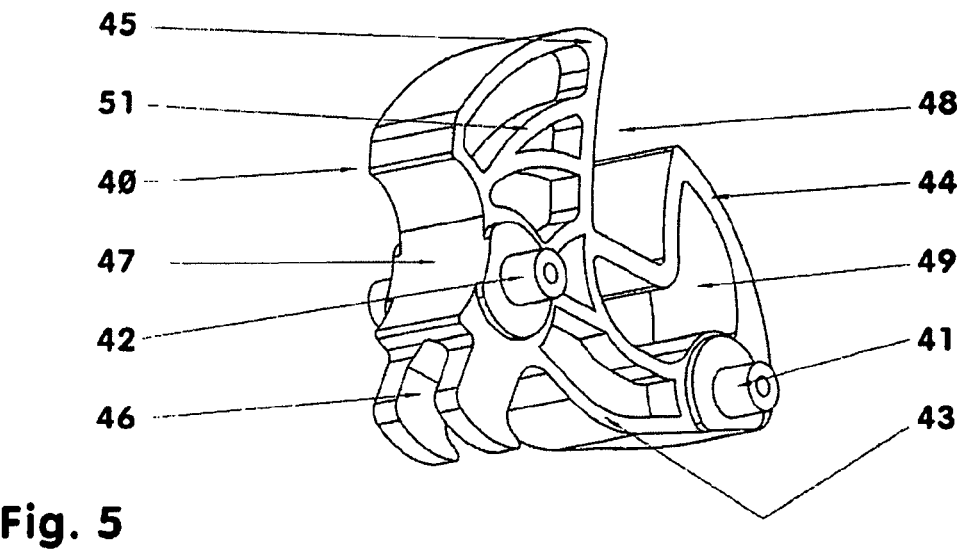
FIG. 5: A carrier element.

In FIG. 5, the carrier element 40 is shown as a separate part. It comprises a support body 43, a pull member 44, a push member 45 and a spring holder 46. The carrier element 40 may be an injection-molded part.

The guide pins 41, 42 are part of the support body 43. It has a push surface area 47 opposite the front wall 16. The push surface area 47 is in the exemplary embodiment in the form of a single axis curved surface. The imaginary axis of curvature extends parallel to the plane of the guide sections 27 of the guide track 26 and normal to the longitudinal direction 25. This axis of curvature is disposed on the side of the carrier element 40 facing away from the front wall 16 outside the carrier element 40. The push surface area however may also have multiple axes of curvature, for example, it may be concavely curved. However, it may also have a convex curvature.

At the bottom side of the support body 43, for example, a double hook shaped spring holder 46 is arranged. In the spring holder a first end of a tension spring 61 is supported which spring serves as repeatedly rechargeable energy store 61. The second end of the tension spring energy store 61 is engaged in a spring receiver 36 which is arranged in the carrier housing 13.

The pull member 44 and the push member 45 delimit an accommodation cavity 48. The pull member 44 which is oriented in the direction of the front wall 16 is lower than the push member 45. The pull member 44 includes a central cutout 49 so that the whole pull member 44 is elastically deformable. The push member 45 has reinforcement ribs 51. Forces, which are effective on the push surface area 52 of the push member 45 delimiting the accommodation cavity 48, are therefore directed to the support body 43.

The deceleration arrangement 70 comprises in the exemplary embodiment two hydraulic cylinder piston units 71, 101, which are supported in the carrier housing 13. The two cylinder-piston units 71, 101 are arranged aligned so that the first cylinder piston unit 71 is oriented in the direction of the carrier element 40 and the second cylinder piston unit 101 is supported on the rear wall 17. Each cylinder-piston unit 71, 101 has a cylinder 72, 102 in which a piston 73, 103 is supported by way of a piston rod 74, 104 so as to be axially removable. Between the piston 73, 103 and the closed cylinder bottom 75, 105, in each case, a return spring 76, 106 is arranged.

Figure 6:
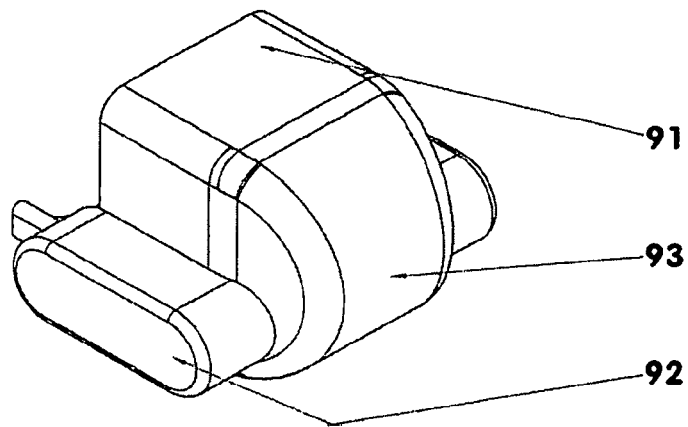
FIG. 6: A guide element.

The piston rod 74 of the first cylinder piston unit 71 has a piston rod head 77 which is engaged in a guide member 91 for example by a press-fit. The cup-shaped guide member 91 is shown in FIG. 6 as a single part. It is provided with elongated guide structures 92 arranged at opposite sides of the guide member 91 which guide structures 92 are supported in the guide tracks 26 of the carrier housing 13. The guide length of the guide structures 92 is in the exemplary embodiment greater than the height of the guide track 26. The front surface 93 of the guide member 91 forms a stop surface. In the exemplary embodiment, the stop surface 93 is a single axis curved surface with an imaginary axis of curvature extending normal to the longitudinal direction 25 and parallel to the plane of the guide sections 27 of the guide tracks 26. For example, the axis of curvature is disposed above the plane mentioned. In the exemplary embodiment, the imaginary axis of curvature extends through the guide member 91 above the guide structure 92. The stop surface 93 may also have two axes of curvature and it may also be curved convexly. Also, other shapes of the stop surface 93 may be selected.

When installed, see FIGS. 2-4 and 7, the stop surface 93 of the guide member 91 faces the push surface 47 of the carrier element 40. Herein, in the exemplary embodiment, the radius of the push surface area 47 is greater than the radius of the stop surface 93 so that, in the representation of FIGS. 2, 4 and 7, the two surfaces come into close contact with each other only along one contact line 95 which extends parallel to the imaginary axis of curvature. In the shown example of the embodiment, the push surface area 47 extends around the stop surface 93.

In the exemplary embodiment, the cylinder 72 of the first cylinder-piston unit 71 has an outer diameter of 8 mm. The stroke of the piston rod 74 is for example 35 mm. With this cylinder-piston unit 71 for example a maximum force of 98 Newton can be decelerated. The diameter of the piston rod 74 is for example 23% of the outer diameter of the cylinder 72.

The internal cylinder wall 7 of this cylinder 72 has for example five sections 81-85. A first section next to the cylinder head 79 is a compensation section 81. Following the compensation section 81 is a truncated cone-shaped section 82, which narrows down toward the cylinder bottom 75. The cone-angle is for example one degree. The length of this section is for example 28% of the piston stroke.

In the direction toward the cylinder bottom 75 next to the truncated cone-shaped section 82, there is a cylindrical section 83. The length of this section 83 is in the exemplary embodiment 57% of the piston stroke. The diameter of the cylindrical section 83 is in the exemplary embodiment 68% of the outer diameter of the cylinder 72.

The cylindrical section 83 is followed by a relief section 84. The diameter of the inner cylinder wall 78 in the relief section 84 is in the exemplary embodiment by 6% larger than the diameter of the inner cylinder wall 78 in the cylindrical section 83. In FIGS. 2 and 7, in which the piston rod 74 of the first cylinder piston unit 71 is shown fully inserted, the piston 73 is disposed for example in the middle of the relief section 84. The piston seal element 86 is not in contact with the inner cylinder wall 78.

Between the relief section 84 and the cylinder bottom 75 and the cylinder bottom wall 75, there is a return section 85. In this truncated cone-shaped return section 85 which narrows down for example toward the cylinder bottom wall 75, the return spring 76 is disposed as shown in FIG. 2.

The cylinder 102 of the second cylinder-piston unit 101 has in the exemplary embodiment, an outer diameter of 10 millimeters. The stroke of the piston 103 which is guided by the piston rod 104 is for example 15 millimeters. The cylinder piston unit 101 is designed for example for a maximum of 110 Newton. The diameter of the piston rod 104 is for example 23% of the outer diameter of the cylinder-piston unit 101.

The cylinder chamber of this cylinder piston unit 101, which is delimited by the inner cylinder wall 108, comprises a compensation section 111, a guide section 112 and a return section 113. The compensation section 111 is delimited by the cylinder head 109. Its inner diameter is for example 75% of the outer diameter of the cylinder 102. The guide section 112 whose length is greater than that of the piston stroke is in the exemplary embodiment cylindrical. The inner diameter of the inner cylinder wall 108 in the guide section 112 is in this embodiment for example 60% of the outer diameter of the cylinder 102. The return section 113 which may for example also be cylindrical is disposed between the guide section 112 and the cylinder bottom 105. In the return section 113, the return spring 106 is disposed.

The first cylinder-piston unit 71 and the second cylinder piston unit 101 may also be of an identical design. Also, for example, the truncated cone-shaped section 82 and/or the relief section 84 may be longer or shorter than described.

In the carrier housing 13, the first cylinder piston unit 71 is retained in radial direction by means of the side walls 14, 15, the guide ledges 21, 22 and the guide webs 33, 34. In the longitudinal direction 25 and also in axial direction of the cylinder-piston unit 71, the cylinder-piston unit 71 is slidably supported in the carrier housing 13. As shown in FIG. 2, the cylinder-piston unit 71 is supported at the bottom on the head 107 of the piston rod 104 of the second cylinder-piston unit 101. The piston rod 104 for example abuts the cylinder bottom 75 centrally. The guide member 91 abuts in this representation with the stop surface 93 the push surface area 47 of the carrier element 40.

The second cylinder-piston unit 101 is engaged in the carrier housing 13 in radial direction by means of the side walls 14, 15 of the guide ledges 19 and the guide webs 32. In the exemplary embodiment, this cylinder-piston unit 101 is supported so as to be movable in the longitudinal direction 25. As shown in FIG. 2, the cylinder bottom 105 abuts the rear wall 17. The piston rod 104 abuts the cylinder bottom 75 of the first cylinder piston unit 71.

The cylinder 102 of the second cylinder-piston unit 101 may be fixed in the carrier housing 13 in the axial direction. It is also possible that the first 71 and/or the second cylinder piston unit 101 is so arranged that the respective piston rod 74, 101 faces in the direction of the rear wall 17. In this case, the guide element 91 is arranged for example on the cylinder 72 of the first cylinder piston unit 71.

If, for example, the second cylinder-piston unit 101 is arranged with its piston rod 104 facing toward the rear wall 17, the piston rod 104 can be fixed to the rear wall 17 and the cylinder 102 can be supported so as to be movable in the carrier housing 13 in the longitudinal direction 25.

The combined acceleration and acceleration device 10 may also include only one cylinder-piston unit 71. This may then for example be of the same design as the first cylinder piston-unit described above. The part of this cylinder piston unit facing toward the rear wall 17 can be fixed in the carrier housing in the axial direction.

During installation the cylinder-piston units 71, 101 are installed in the carrier housing 13 together with the guide member 91 and the carrier element 40. In the process, the cylinder-piston units 71, 101 are firmly engaged between the guide ledges 19, 21, 22 and the guide webs 32-34. The carrier element 40 engages in the guide tracks 26. Finally, the tension spring 61 is hooked to the carrier element 40 and the carrier housing 13. If desired an elastomer body can be arranged at the connecting web 18 at the side facing the carrier element 40.

FIGS. 1 and 2 show the acceleration and deceleration device 10 with the carrier element 40 disposed in the end position 12, in which for example, the drawer or the sliding door is closed. The piston 73, 103 and the piston rods 74, 104 of the cylinder-piston units 71, 101 are inserted. The return springs 76, 106 are tensioned. The spring energy store 61 is relaxed.

Upon opening of for example the drawer or the sliding door, the carrier 1 pulls the carrier element 40 in the opening direction 3 out of the end position 12 toward the park position 11, see FIG. 3. The spring energy store 61 is being charged thereby. The slide surface area 47 moves off from the stop surface 93. The return spring 106 of the second cylinder-piston unit 101 expands and move the piston 103 toward the cylinder head 109. The piston rod 104 connected to the piston 103 is moved outwardly. The piston rod 104 presses onto the cylinder bottom 75 of the first cylinder-piston unit 71 and moves the whole cylinder-piston unit 71 relative to the carrier housing 13 toward the carrier element 40. At the same time, the return spring 76 of the first cylinder piston unit 71 moves the piston 73 in a direction of the cylinder head 79. The piston rod 74 moves outward guided by the guide member 91.

The acceleration and the deceleration speed of the piston rod 104 of the second cylinder-piston unit 101 and the acceleration and deceleration speed of the piston rod 74 of the first cylinder-piston unit 71 are determined by the return spring 76 of the first cylinder-piston unit 71 and the mass inertia of the masses moved. These speeds are independent of the spring energy store 61.

The carrier element 40 is further moved toward the park position 11 until the guide pins 41 move into the holding section 28. The carrier element 40 pivots thereby around the rear guide pins 42. This pivot movement is supported by the force of the tensioned spring 61. In the exemplary embodiment, the carrier element 40 is now retained secured in the park position 11 in a force- and form-locking manner, see FIG. 4. If desired the development of any noise during the locking procedure can be reduced by elastomer elements arranged on the connecting web 18. When the drawer or the sliding door is further opened, the carrier 1 moves out of engagement with the carrier element 40. The drawer or sliding door can then be fully opened.

The two piston rods 74, 104 are for example moved further outwardly until the guide block 91 abuts with its stop surface 93, the push surface area 47 of the carrier element 40. But it is also possible, that, with completely extended piston rods 71, 74, 104, the stop surface 93 is spaced from the push surface area 47.

When the sliding door or the drawer is again closed, the carrier 1 is moved with closing direction 2 toward the acceleration and deceleration device 10, see FIG. 4. Before reaching the closed end position of the sliding door or the drawer, the carrier 1 contacts the push surface area 52 of the push member 45 of the carrier element 40. The carrier element 40 is pivoted thereby so that the two guide pins 41, 42 are both disposed in the guide section 27. The charged spring energy store 61 is not being discharged. The push surface area 47 applies a force to the stop surface 93. The two surface areas 47, 93 are in contact along a contact line 95. During pivoting of the carrier element 40, the push surface area 47 slides for example along the stop surface 93. During pivoting, the contact line 95 moves relative to the carrier element 40 as well as relative to the guide member 91. The guide member 91 which is supported in the guide section 27 prevents a deformation of the piston rod 74 even if the force effective on the carrier element 40 is eccentric. Also, with a multiple sudden force application to the push surface area 52 any force components which are not oriented in the longitudinal direction 25 are transmitted via the guide member 91 and the guide tracks 26 into the carrier housing 13. In this way, an off-center force application to the piston rod 70 which may result in leaking conditions of the cylinder piston units 71, 101 is prevented.

The piston rod 74 applies a force to the piston 73 and the piston 73 applies, via the oil in the displacement chamber 87, a force to the cylinder bottom 75 and the piston rod 104 of the second cylinder piston unit 101. The piston rod 74 of the first cylinder-piston unit 71 and the piston rod 104 of the second cylinder-piston unit 101 are moved into the respective cylinders. Initially, at least essentially the same force is effective on both piston rods 74, 104. The stroke of the carrier element 40 corresponds to the sum of the stroke of the piston 73 of the first cylinder-piston unit 71 and the stroke of the piston of the second cylinder piston unit 101.

During movement of the carrier element 40, the piston 73 of the first cylinder-piston unit 71 reaches the truncated cone-shaped section 82. As a result, the retardation force opposing the inward movement of the piston 73 increases strongly. In the second cylinder-piston unit 101, the piston 103 moves in the guide section 112. Here, the counterforce increases for example linearly with the piston stroke. The pistons 73, 103 move into the respective cylinders depending on the momentary ratio of the counter force of the second cylinder-piston unit 101 and the retardation force of the front cylinder-piston unit 71. This provides for the resulting deceleration by a superimposition of the retardation forces generated by the two cylinder-piston units. The carrier element 40 and, as a result, the drawer or the sliding door are strongly retarded.

As soon as the piston 73 of the first cylinder-piston unit 71 reaches the cylindrical section 83, the retardation force increases linearly with the stroke. In the second cylinder piston unit 101, the linear ratio between counter force and stroke continues. The carrier element 40 is therefore retarded essentially linearly with the stroke.

Upon reaching the relief section 84, the piston of the first cylinder-piston unit 71 loses its contact with the inner cylinder wall 78. As a result, the retarding force of the first cylinder piston unit 71 drops. The piston 103 of the second cylinder-piston unit 101 is still in the guide section 112. The overall retardation is now determined essentially by the second cylinder piston unit 101. As soon as the pistons 73, 103 have reached their end positions, the carrier element 40 is also in its end position 12, see FIG. 2.

The individual cylinder-piston units 71, 101 may have linear or non-linear force-stroke characteristic curves. In the over-all acceleration- and deceleration device 10, almost any desired force-stroke characteristic curve can be realized. With the use of a first cylinder-piston unit 71 and a second cylinder piston unit 101 standard cylinder-piston units can be combined for achieving different force-stroke characteristic curves. Also, large masses of sliding doors for example over 40 kg can be slowed down in a controlled manner, along a stroke of for example 50 millimeters.

Also a combination of the individual exemplary embodiments are feasible.

REFERENCE NUMERAL LIST

| | |
|---|---|
| 1 | Carrier |
| 2 | Closing direction |
| 3 | Opening direction |
| 10 | Combined acceleration and deceleration device |
| 11 | Park position |
| 12 | End position |
| 13 | Carrier housing |
| 14 | Side wall |
| 15 | Side wall |
| 16 | Front wall |
| 17 | Rear wall |
| 18 | Connecting web |
| 19 | Guide ledge |
| 21 | Guide ledge |
| 22 | Guide ledge |
| 23 | Mounting opening |
| 24 | Bottom |
| 25 | Longitudinal direction |
| 26 | Guide tracks |
| 27 | Guide section |
| 28 | Holding section |
| 29 | Transition section |
| 31 | Top side |
| 32 | Connecting web |
| 33 | Connecting web |
| 34 | Connecting web |
| 35 | Longitudinal slots |
| 36 | Spring receiver |
| 40 | Carrier element |
| 41 | Guide pin |
| 42 | Guide pin |
| 43 | Support body |
| 44 | Pull member |
| 45 | Push member |
| 46 | Spring holder |
| 47 | Push surface area |
| 48 | Accommodation cavity |
| 49 | Central opening |
| 51 | Reinforcement ribs |
| 52 | Push surface area |
| 60 | Acceleration arrangement |
| 61 | Energy store, tension spring |
| 70 | Deceleration arrangement |
| 71 | First cylinder-piston unit |
| 72 | Cylinder |
| 73 | Piston |
| 74 | Piston rod |
| 75 | Cylinder bottom |
| 76 | Return spring |
| 77 | Piston rod head |
| 78 | Internal cylinder wall |
| 79 | Cylinder head |
| 81 | Compensation section |
| 82 | Truncated cone-shaped section |
| 83 | Cylindrical section |
| 84 | Relief section |
| 85 | Return section |
| 86 | Piston seal element |
| 87 | |
| 91 | Guide member |
| 92 | Guide structure |
| 93 | Stop surface |
| 95 | Contact line |
| 101 | Second cylinder piston unit |
| 102 | Cylinder |
| 103 | Piston |
| 104 | Piston rod |
| 105 | Cylinder bottom |
| 106 | Return spring |
| 107 | Piston rod head |
| 108 | Inner cylinder wall |
| 109 | Cylinder head |
| 111 | Compensation section |
| 112 | Guide section |
| 113 | Return section |

What is claimed is:

1. A combined acceleration and deceleration device (10) with a carrier housing (13) and a carrier element (40) which is movable along at least one guide track (26) of the carrier housing (13) between a park position (11) in which the carrier element (40) is lockable and an end position (12) under the control of an acceleration arrangement (60) and a deceleration arrangement (70), wherein the deceleration arrangement (70) comprises a hydraulic cylinder piston unit (71) with a spring return structure (76), the acceleration arrangement (60) comprising a repeatedly chargeable and dischargeable spring energy store (61) supported between the carrier housing (13) and the carrier, element (40), the cylinder piston unit (71) carrying a guide member (91) which faces the carrier element (40) and is guided in the at least one guide track (26), the guide member (91) having a partially cylindrical curved stop surface (93) facing toward the carrier element (40), the carrier element (40) having a partially cylindrical curved push surface area (47) facing the guide member (91), and the partially cylindrical curved push surface area (47) and the partially cylindrical curved stop surface (93) having different radii of curvature, so that their axes of curvature extend parallel to each other and the stop surface (93) and the push surface (47) come into contact only along a contact line (95).

2. The combined acceleration and deceleration device (10) according to claim 1, wherein the push surface area (47) extends over the stop surface (93).

3. The combined acceleration and deceleration device (10) according to claim 1, wherein the guide member (91) has guide structures (92) whose guide length in the longitudinal direction (25) is greater than the height of the guide track 26 normal to the longitudinal direction 25 and normal to the plane of the guide section (27).

4. The combined acceleration and deceleration device (10) according to claim 1, wherein the cylinder-piston unit (71) is supported in the carrier housing (13) so as to be axially movable.

5. The combined acceleration and deceleration device (10) according to claim 1, wherein a force-stroke characteristic curve of the cylinder-piston unit (71) is non-linear.

6. The combined acceleration and deceleration device (10) according to claim 1, comprising a second cylinder-piston unit (101) arranged in series with the first cylinder-piston unit (71).

7. The combined acceleration and deceleration device (10) according to claim 6, wherein the cylinder-piston units (71, 101) have different force-stroke characteristic curves.

* * * * *